United States Patent [19]

Toye et al.

[11] Patent Number: 4,842,129
[45] Date of Patent: Jun. 27, 1989

[54] HOUSING AND BEARING ASSEMBLY FOR A LIVE ROLLER CONVEYOR

[75] Inventors: Edward W. Toye, Hereford; Leslie Bowen, deceased, late of Hereford; Janet R. Bowen, legal representative, Hereford; Walter L. Danks, legal representative, Market Place Rowley Regis Warley West, all of United Kingdom

[73] Assignee: Conveyor Units Limited, Worcestershire, England

[21] Appl. No.: 891,964

[22] Filed: Jul. 31, 1986

[30] Foreign Application Priority Data

Aug. 1, 1985 [GB] United Kingdom ............... 8519381
Nov. 29, 1985 [GB] United Kingdom ............... 8529488

[51] Int. Cl.[4] .................................... B65G 13/02
[52] U.S. Cl. .................................. 198/790; 384/498
[58] Field of Search ................. 198/781,790,783; 384/209, 498, 558, 585

[56] References Cited

U.S. PATENT DOCUMENTS

| | | | |
|---|---|---|---|
| 2,695,203 | 11/1954 | Anderson | 384/498 X |
| 3,446,542 | 5/1969 | Whitehurst | 384/498 X |
| 3,826,351 | 7/1974 | Fromme | 198/787 |
| 3,961,700 | 6/1976 | Fleischauer | 198/781 X |
| 4,124,257 | 11/1978 | Derner et al. | 384/498 |
| 4,196,312 | 4/1980 | DeGood et al. | 198/790 X |
| 4,588,073 | 5/1986 | Abell | 198/790 X |

FOREIGN PATENT DOCUMENTS

| | | | |
|---|---|---|---|
| 2337427 | 2/1974 | Fed. Rep. of Germany | 198/790 |
| 1456610 | 6/1975 | Fed. Rep. of Germany . | |
| 2426619 | 12/1975 | Fed. Rep. of Germany | 198/789 |
| 2448180 | 6/1981 | Fed. Rep. of Germany . | |
| 2182644 | 12/1973 | France . | |
| 1313825 | 4/1973 | United Kingdom . | |
| 2074119 | 10/1981 | United Kingdom | 198/787 |
| 2114084 | 8/1983 | United Kingdom . | |

Primary Examiner—Robert J. Spar
Assistant Examiner—Lyle K. Kimms
Attorney, Agent, or Firm—Marshall, O'Toole, Gerstein, Murray & Bicknell

[57] ABSTRACT

A bearing and housing assembly includes first and second housing sections and fasteners for releasably securing the first housing section to the second housing section. A bearing assembly interposed between the housing section includes an inner bearing member fixed to a shaft and an outer bearing member rotatably mounted to the inner bearing member. The housing sections include openings for securing the bearing assembly therebetween.

10 Claims, No Drawings

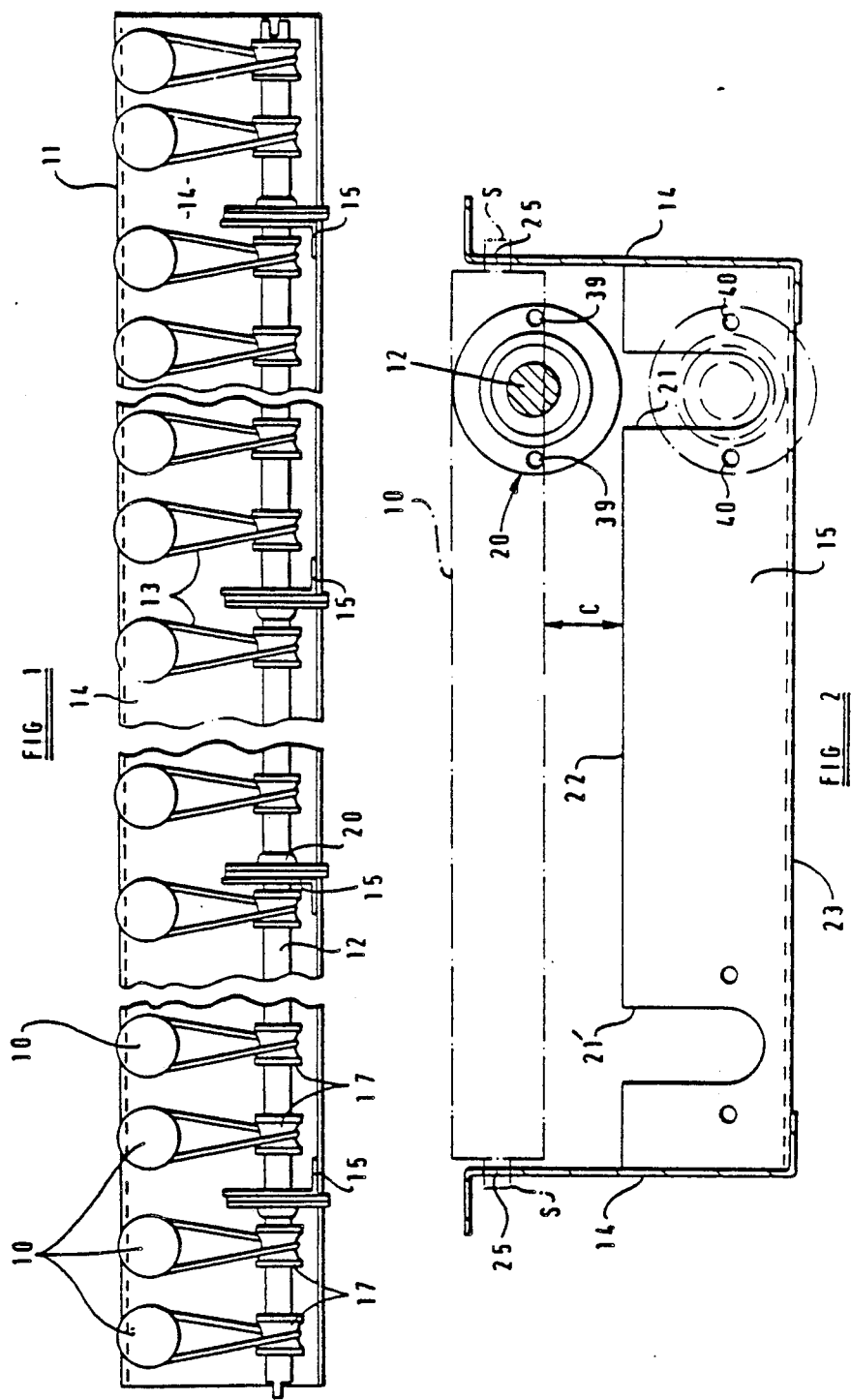

HOUSING AND BEARING ASSEMBLY FOR A LIVE ROLLER CONVEYOR

BACKGROUND AND SUMMARY OF INVENTION

This invention relates to a live roller conveyor, that is, a conveyor comprising a plurality of rollers which form a conveying surface for an article placed on the conveyor, at least some of the rollers being driven by a drive means.

More particularly, the invention relates to a live roller conveyor in which the drive means comprises a drive shaft which extends transverse to the rollers generally along the conveyor in the direction in which the articles are conveyed, drive belts being engaged with the drive shaft and the driven rollers to transmit drive from the drive shaft, which in use is rotated about its longitudinal axis, to the driven rollers.

Such a conveyor will hereinafter be referred to as being "of the kind specified".

Conventionally, conveyors of the kind specified comprise side frame members between which the rollers extend, the side frame members being interconnected by cross braces for rigidity. The drive shaft is mounted below the cross braces and is journaled in bearings which are secured to the undersides of at least some of the cross braces. Such a construction suffers from at least the following disadvantages.

It will be appreciated that, in use, the belts which extend between the drive shaft and the driven rollers wear and after a given time, require replacement. The replacement belts have to be fed along the drive shaft from one end. In a conventional construction this requires the bearings to be dismantled from the cross braces which disturbs the alignment of the drive shaft. Further, because the drive shaft is mounted beneath the cross braces, this dismantling has to be carried out from beneath the conveyor as does all maintenance work on the bearings, which is obviously difficult and inconvenient.

An object of the present invention is to provide a new or improved conveyor of the kind specified which overcomes or reduces the above mentioned problems.

According to one aspect of the invention we provide a conveyor of the kind specified wherein the drive shaft is·mounted beneath the rollers and above a plane containing the lowermost point or points of the cross braces.

Thus access to the drive shaft can be obtained from above the conveyor, although it may be necessary to remove one or more of the rollers from the conveyor before maintenance procedures can be carried out. However the rollers are conveniently mounted·so as to be readily removable from the conveyor to facilitate belt replacement, and hence this presents no problem.

Preferably, each of the cross braces has a downwardly extending slot which opens to the top of the cross brace. The drive shaft may be received in the slots and be mounted for rotation about an axis between the plane containing the lowermost point or points of the cross braces and another plane containing the uppermost point or points of the cross braces.

Alternatively, the cross braces or some of the cross braces may carry mountings which receive the drive shaft so that the drive shaft is located for rotation about an axis which lies beneath the rollers but about a plane containing the uppermost point or points of the cross braces.

The cross braces or at least some of the cross braces may carry a bearing in which the drive shaft is journaled for rotation. Preferably, all of the cross braces carry such a bearing.

In a preferred embodiment, where the cross braces each have a slot opening to the top, the bearings are bolted or otherwise releasably fastened to the cross braces around the periphery of the respective slot.

The clearance between the slots of the cross braces and the drive shaft, when the bearing is dismantled, is preferably sufficiently large to enable a replacement belt or belts to be threaded past.

In such a construction, it has been found that worn drive belts can be replaced without disturbing the alignment of the drive shaft because only one bearing needs to be dismantled from engagement with its respective cross brace at a time, the bearing being re-secured to the respective cross brace when the or each replacement belt has been threaded past, before the next bearing is dismantled.

Each bearing preferably comprises at least two housing parts, the two housing parts being secured together and to the respective cross brace by a common fastening means. Thus in dismantling the bearing from engagement with its respective cross brace, the housing parts of the bearing are also readily separable.

Preferably each bearing also comprises a hub part which, in use, is interposed between the two housing parts, the hub carrying at least an inner bearing race which rotates with the drive shaft relative to an outer bearing race which may be provided by the hub, or by one or both of the housing parts. The housing parts may each have an opening in which the hub part is received, the clearance between a wall of the opening and the drive shaft being sufficient to enable a drive belt to be threaded therethrough. Thus one or more replacement drive belts can be threaded along the drive shaft through the openings in the housing parts, over the hub part, and through the respective slot in the cross brace, to a desired position along the drive shaft.

Alternatively where the drive belt is sufficiently large and/or the exterior dimensions of the housing parts are sufficiently small, the belt may simply be passed over the housing parts and over the hub to a desired position along the drive shaft.

The circumferential mating surfaces of the hub and the two housing parts are preferably part-spherical so that the hub can become misaligned within the housing parts without deterimentally affecting the efficiency of the bearing. This is particularly an advantage on bend conveyor sections when the drive shaft may not extend at exactly 90° to the cross braces.

The housing part, which in use is nearest the cross member, may be made by molding, for example, a plastics material. It has been found that in such a construction, noise levels are reduced as the drive shaft rotates.

The drive shaft may comprise a plurality of pulleys with which the drive belts are engaged.

The conveyor may comprise a plurality of conveyor sections each having its own drive shaft and associated bearings, cross braces, and conveyor side frame members and rollers, the drive shaft of each section being coupled to the drive shaft of another section to enable drive to be transmitted along the conveyor. Drive shafts may be coupled by coupling means which enable the drive shaft to transmit power to another conveyor section, and/or to receive power from another conveyor section.

The conveyor sections may be straight, in which case the rollers are all parallel to one another, and the drive shaft may extend generally perpendicular to the axes of rotation of each of the rollers, or the conveyor may include a bend section, in which case the axes of rotation of some of the rollers may be arranged transverse to the axes of rotation of others of the rollers and to the drive shaft.

According to a second aspect of the invention, we provide a bearing for use with a conveyor according to the first aspect of the invention, the bearing comprising at least two housing parts and a hub, the hub carrying an inner bearing race which in use rotates with a shaft journaled in the bearing, the housing parts each having an opening to enable the hub to be interposed between the housing parts, the hub, or one or both of the housing parts, carrying an outer bearing race.

The hub preferably has a collar which extends axially along the drive shaft beyond the or one of the housing parts when the housing parts are assembled, the collar being adapted to be received in an opening in a mounting.

The mounting may comprise a cross brace of a conveyor in accordance with the first aspect of the invention, the opening in the cross brace comprising a slot which extends downwardly from the top of the cross brace.

The shaft journaled in the bearing may comprise a drive shaft of the conveyor.

Preferably, when the housing parts are separated from the hub part, there is adequate clearance between the shaft and the periphery of the opening in each housing part, to enable a drive belt to be threaded therethrough. The drive belt may be threaded over the hub which is preferably of smaller diameter than the housing parts. Alternatively the exterior dimensions of the housing parts of the drive belt may be such that the drive belt may be passed over the housing parts.

The hub may comprise inner and outer bearing races with rolling elements such as ball bearings or rollers between the races. The circumferential mating surfaces of the housing parts and the outer bearing race of the hub may be part-spherical.

BRIEF DESCRIPTION OF THE DRAWINGS

The invention will now be described with the aid of the accompanying drawings in which:

FIG. 1 is a side view of part of a conveyor in accordance with the invention, with a side frame member removed for clarity.

FIG. 2 is a sectional front view, partly exploded, of the conveyor of FIG. 1.

DESCRIPTION OF THE PREFERRED EMBODIMENTS

Figure 3:
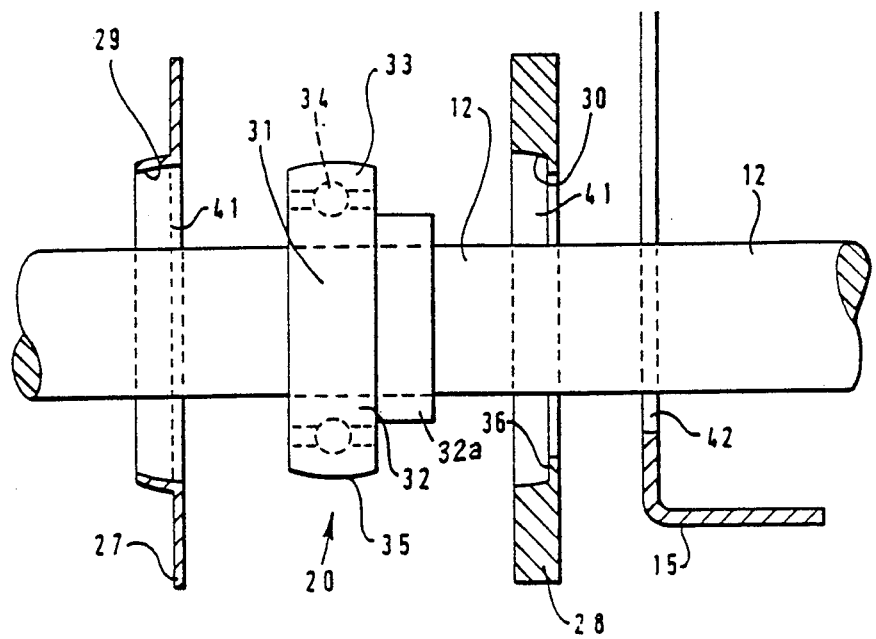
FIG. 3 is an enlarged exploded sectional view of another part of the conveyor of FIG. 1.

Referring first to FIG. 1, a conveyor in accordance with the invention comprises a plurality of rollers 10, arranged side by side for rotation about parallel axes. The rollers 10 form conveying surface 11 on their upper sides, and all are driven via a drive means comprising a drive shaft 12 via drive belt 13.

The rollers 10 are journaled in bearings (not shown) which are received in side frame members 14 and cross braces 15 extend between the side frame members 14 as can be seen in FIG. 2.

The rollers 10 each have, adjacent their ends, a groove which provides a pulley in which the flexible bands 13 are received. The drive shaft 12 also carries a plurality of pulleys 17 around which the drive belts 13 also pass to facilitate transmission of drive.

Such a conveyor is well known in the art and further detailed description of the principle of the conveyor is not considered necessary.

Conventionally, drive shafts 12 are journaled in bearings which are mounted beneath the cross braces 15. This means that all maintenance work needs to be carried out from beneath the conveyor.

In the conveyor in accordance with the invention, the drive shaft 12 is journaled in bearings 20 which are received in slots 21 provided in the cross braces 15. The slots 21 extend downwardly and open from the top 22 of the cross braces 15. In FIG. 2, one drive shaft on the right hand side of the figure is shown in dotted lines in its mounted position with the bearing 20 received in the slot 21, whilst another drive shaft 12 on the right of the figure is shown in a dismantled condition.

This construction enables maintenance of the drive shaft 12 and bearings 20 to be carried out from on top of the conveyor, once one or more of the rollers 10 have been removed.

The cross braces 15 have secondary slots 21 similar to slot 21 to enable a secondary shaft to be provided for the operation of ancillaries such as switches and merges. The secondary shaft may be mounted in bearings such as bearings 20 described in detail hereinafter.

Conventionally, the rollers 10 are received in easily releasable bearing means which enable them to be readily removed from engagement with the side members. In FIG. 2, apertures 25 are shown in the side frame members 14 which receive the spindles S in the ends of the rollers 10.

Referring now to FIG. 3, the construction of one of the bearings 20 is illustrated. The bearing 20 comprises two housing parts 27 and 28, each of which has a respective opening 29 and 30. The bearing 20 further comprises a hub part 31 which comprises an inner bearing race 32, which in use rotates with the shaft 12, and an outer bearing race 33 with roller elements 34 such as ball bearings or rollers interposed between the inner and outer races 32 and 33.

Formed integrally with the inner race 32 is a collar 32a, the purpose of which will become apparent hereinafter.

It can be seen that the outer surface 35 of the outer bearing race 33 is of part-spherical configuration. The inner surfaces of the openings 29 and 30 in the first 27 and second 28 housing parts are of corresponding part-spherical configuration. Thus when the housing parts 27 and 28 are assembled together with the hub part 31 interposed between the housings, the hub 31 can become misaligned slightly with respect to the housing parts which is particularly useful on bend conveyor sections when the drive shaft 12 may not extend at exactly 90° to the cross braces. The hub 31 can therefore align itself to the housing parts 27 and 28 to accommodate the drive shaft 12 without detrimentally affecting the efficiency of the bearing.

The housing part 28 has a step 36 provided at the end of the opening 30, which is abutted by the hub 31 to restrict longitudinal movement of the hub relative to the housing part 28. Preferably, at least housing part 28, which in use lies adjacent the cross brace 15, is molded or otherwise manufactured in plastics material. It has been found that this reduces noise levels of the conveyor as the drive shaft rotates.

Each of the housing parts 27 and 28 have a plurality of holes 39, in the present example two, which are best seen in FIG. 2. Further, the surrounding area of each slot 21 in the cross braces 15 also has two holes 40 which are aligned with the holes 39 in the housing parts 27 and 28 of the bearings 20. Thus, when the drive shaft 12 is received in the slot 21, fasteners such as bolts may be passed through the holes 39 and 40 to both secure the housing parts 27 and 28 together and to secure the bearing 20 to the cross brace 15. Nuts may be received on the bolts.

It can be seen that there is a large clearance 41 between the opening 29 and the shaft 12, and between the opening 30 and the shaft 12. Further, there is a clearance 42 between the drive shaft 12 and the periphery of the slot 21 in which it is received.

In use, the drive belts 13 wear and require replacement. In a conventional arrangement, it is necessary to dismantle the entire drive shaft 12 from each of the bearings in which it is mounted below the cross braces 15, by accessing the bearings below the conveyor. In the present example, by simply dismantling the bearing 20 as shown in FIG. 3 by releasing the bolts, a replacement drive belt 13 may be threaded along the drive shaft 12 through the clearances 41 and over the hub part 31. Because the drive belt can be threaded through openings 41, there is no need to stretch the drive band over the housing parts 27 and 28.

Further, the drive belts 13 can be threaded through the clearance 42 between the drive shaft 12 and periphery of the slots 21.

Where the drive belt 13 is sufficiently large, instead of passing the belt 13 through clearances 41 between the housing parts 27 and 28, and the shaft 12, the belt may be passed over the housing parts 27 and 28 in addition to over the hub 31, although of course the belt 13 would still need to pass through clearance 42 between the cross brace 15 and the shaft 12 in order to reach the desired position along the shaft 12, once the bearing 20 has been separated from engagement with the cross brace 15.

By releasing only one of the four bearings 20 seen in FIG. 1 at a time and threading the belt along the drive shaft 12 past the dismantled bearing 20, provided that the bearing 20 is reassembled prior to the next adjacent bearing being dismantled, alignment of the drive shaft 12 in the cross braces 15 is maintained during maintenance.

In FIG. 1, only one conveyor section is shown. In use, this conveyor section would be part of a conveyor comprising a plurality of such sections, in which case, the drive shafts 12 may be adapted at either end, as shown, by being provided with suitable coupling means, to be coupled to further drive shafts of the further conveyor sections.

As shown, the conveyor section is a straight section, i.e., the axes of rotation of the rollers 10 are all parallel and the drive shafts are generally perpendicular relative to the rollers 10 and to the cross braces. Another conveyor section incorporating the invention may comprise a bend in which at least some of the axes of rotation of the rollers 10 are arranged transverse to one another. In this event, rather than a simple key coupling between the drive shafts and adjacent drive shafts as shown in FIG. 1, at either end of the drive shaft (and intermediate the ends if required), a universal joint or the like may be provided to enable drive to be transmitted from one drive shaft to an adjacent, non-aligned drive shaft.

Various modifications may be made without departing from the scope of the invention. For example, instead of the drive shaft 12 being received in slots 21 in the cross braces 15, if desired an appropriate mounting means may be provided on the upper surface 22 of the cross braces 15. In this event, the drive shaft would still be mounted in a position between the rollers 10 and the drive shaft would still be mounted in a position between the rollers 10 and the lower surfaces 23 of the cross braces 15, although a greater clearance between the cross brace 15 and roller 10 would be required than shown in FIG. 2. In any case, in an arrangement in accordance with the invention, the drive shaft 12 is mounted between the rollers 10 and the lower surface 23, or a plane containing the lowermost part or parts, of the cross braces 15.

If desired, as described, a single drive shaft 12 only may be provided to drive all of the rollers 10, although if desired, two or more drive shafts may be provided, for example two drive shafts driving alternate rollers. In another embodiment, a live roller conveyor has idler rollers interposed between driven rollers to which no drive shaft is connected.

Although as shown, a bearing 20 comprising a pair of housing parts 27 and 28 with a hub part 31 interposed between is used, any other bearing which preferably permits a drive band to be threaded over the drive shaft may be provided.

The features disclosed in the foregoing description, or the accompanying drawings, expressed in their specific forms or in terms of a means for performing the disclosed function, or a method or process for attaining the disclosed results, or a class or group of substances or compositions, as appropriate, may, separately or in any combination of such features, be utilized for realizing the invention in diverse forms thereof.

I claim:

1. A conveyor for transporting a plurality of articles comprising spaced parallel individually rotatable rollers, means for rotatably mounting said rollers to define a pass line extending along the length of said conveyor, the rollers extending between side frame members which are interconnected by cross braces, each cross brace having a downwardly extending slot which opens to the top of the cross brace, means for driving at least some of the rollers, said means for driving said rollers including a rotatable drive shaft and drive belts engaged with the drive shaft and the rollers to transmit drive from the drive shaft to the rollers, the drive shaft extending transverse to the rollers generally in the direction of said pass line, said shaft being mounted in said slot to extend generally perpendicularly to the cross brace for rotation in a series of bearing assemblies each dismountably supported by said cross brace beneath the rollers and above a surface containing the lowermost points of the cross braces, the mounting provided by each cross brace and bearing assembly, when the bearing assembly is dismounted from its respective cross brace, permitting a drive belt to be moved along the drive shaft from one side of the respective cross brace to the other side thereof.

2. A conveyor according to claim 1 wherein the drive shaft is mounted for rotation about an axis below a surface containing the uppermost points of the cross braces.

3. A conveyor according to claim 2 wherein at least some cross braces each carry a bearing in which the drive shaft is journaled for rotation, the bearings being releasably mounted on the cross braces around the periphery of the respective slot.

4. A conveyor according to claim 3 wherein a clearance is provided between the slots of the cross braces and the drive shaft which, when the bearing is dismounted, is sufficiently large to enable a drive belt to be passed therethrough.

5. A conveyor according to claim 3 characterized in that each bearing comprises at least two housing parts, the two housing parts being secured together and to the respective cross brace by a common fastening means, with a hub part between the two housing parts, the hub part carrying at least an inner bearing race which rotates with the drive shaft relative to an outer bearing race.

6. A conveyor according to claim 5 wherein the housing parts each have an opening in which the hub part is received, the clearance between a wall of the opening and the drive shaft being sufficient to enable a drive belt to be passed therethrough.

7. A conveyor according to claim 5 wherein the circumferential mating surfaces of the hub and the two housing parts are part-spherical.

8. A conveyor according to claim 1 wherein the conveyor comprises a plurality of conveyor sections each having its own drive shaft and associated bearings, cross braces, and conveyor side frame members and rollers, the drive shaft of each section being coupled to the drive shaft of another section to enable drive to be transmitted along the conveyor.

9. A conveyor according to claim 6 wherein the hub part has a collar which extends axially along the shaft beyond the or one of the housing parts when the housing parts are assembled, the collar being received in said slot in an associated cross brace.

10. A conveyor according to claim 6 characterized in that the hub part comprises inner outer bearing races with rolling elements therebetween.

* * * * *